Jan. 15, 1924.

H. L. BLOOD 1,480,596

WORK SUPPORT POSITIONING MEANS FOR GEAR GENERATING MACHINES

Filed Oct. 7, 1921

Inventor
H. L. Blood
By Joseph K. Schofield
Attorney

Patented Jan. 15, 1924.

1,480,596

UNITED STATES PATENT OFFICE.

HAROLD L. BLOOD, OF NORTH PLAINFIELD, NEW JERSEY, ASSIGNOR TO NILES-BEMENT-POND COMPANY, OF NEW YORK, N. Y., A CORPORATION OF NEW JERSEY.

WORK-SUPPORT-POSITIONING MEANS FOR GEAR-GENERATING MACHINES.

Application filed October 7, 1921. Serial No. 506,001.

*To all whom it may concern:*

Be it known that I, HAROLD L. BLOOD, a citizen of the United States, residing at North Plainfield, in the county of Somerset and State of New Jersey, have invented certain new and useful Improvements in Work-Support-Positioning Means for Gear-Generating Machines, of which the following is a specification.

This invention relates to machine tools and in particular to precision machine tools requiring accurate indexing movements of the work supporting and positioning member.

More particularly the invention is designed for a gear generating machine in which the gear is mounted on a saddle which in turn is mounted on a rotating table, these two members comprising a supporting member so arranged that by suitably reciprocating the saddle and rotating the table, a rolling action of the gear relative to a rack form cutter may be simulated.

An object of the present invention is to provide means whereby the power required of the driving members for the rotary table and reciprocating saddle may be materially lessened during the indexing movements. Also, it is an object of the invention to securely lock the table and saddle in predetermined adjusted position during the actual cutting operation and also to assist in moving the table and saddle when the table and saddle are moved in a reverse direction, all of these means being operated in a predetermined cycle.

Another object of the invention is to provide the above mentioned means in the form of a simple device adapted to mesh with the rotating table and, by means of rotation of this member in reverse directions at predetermined times, the functions of this invention may be accomplished. Also, preferably, the driving means for this device comprises a small motor which may be operated in either direction and may be suitably controlled to give a weak or a strong turning effect, or torque, in accordance with the requirements of the mechanism at different points in the cycle of operation.

In continued operation of precision machine tools, particularly where the adjustments of the parts must be controlled with a high degree of precision, it is desirable to limit the stresses applied to the moving elements, which are usually screws, so that inaccuracies due to wear may be eliminated. This is particularly desirable when the work supporting member is heavy and is required to be moved in both directions a great many times. Also, inaccuracies due to lost motion between the operating parts may arise which are best obviated by providing means to hold the lost motion always on the same side during the cutting or other operation.

The present invention provides a construction accomplishing the above functions by the provision of a small motor, the electric circuits for which are controlled by switches opened and closed by operation of the machine elements. By means of varying the current through the armature of the motor, its torque and direction of rotation may be varied to aid in moving the work supporting member in either direction during the indexing movements, to lock the work support during the cutting operation, to release the work support as soon as the cutting operation is complete and then to aid in reversing the work support to return it to its initial position after a plurality of indexing movements.

With these and other objects in view my invention consists in the features of construction and operation set forth in the following specification and illustrated in the accompanying drawing.

In the accompanying drawing annexed hereto and forming a part of this specification, I have shown my invention embodied in a gear generating machine but it will be understood that the invention can be otherwise embodied and that the drawings are not to be construed as defining or limiting the scope of the invention, the claims appended to this specification being relied upon for that purpose.

Figure 1:
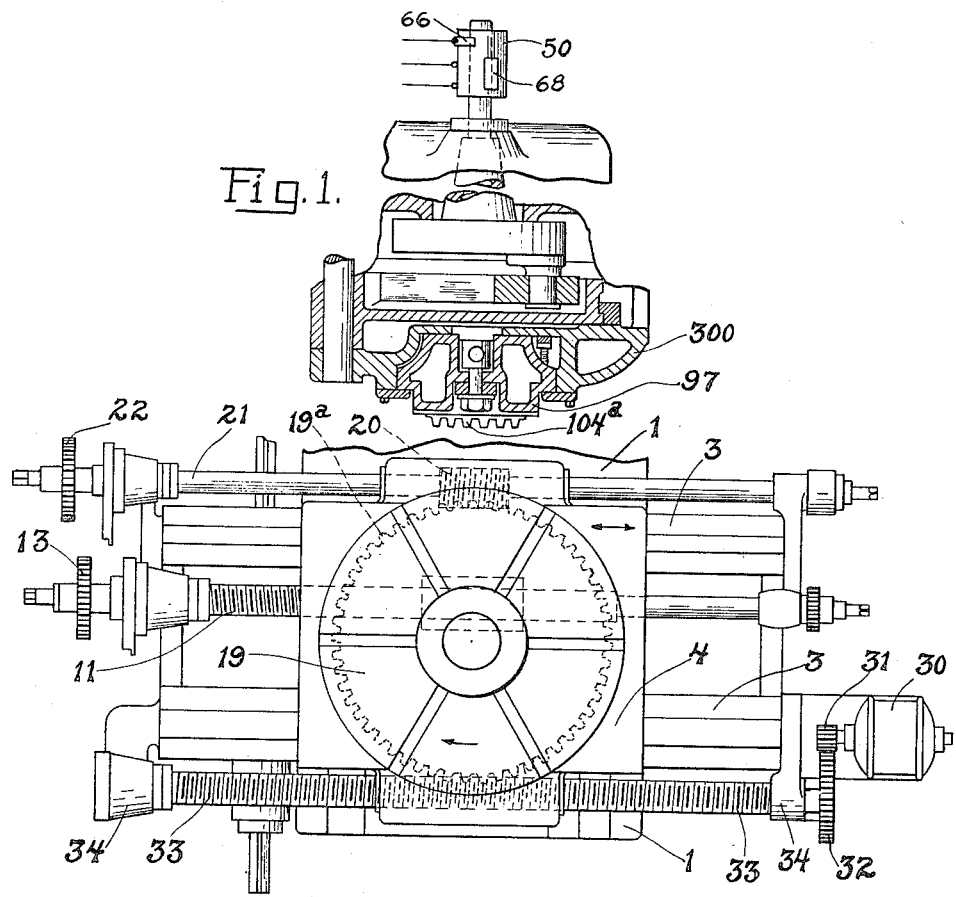
Figure 1 is a fragmentary plan view, partly in section, of mechanism to which the invention may be applied.

In the above mentioned drawing, I have shown but one embodiment of the invention which is now deemed preferable, but it is to be understood that changes and modifications may be made within the scope of the appended claims without departing from the spirit of the invention.

Briefly, in its broadest aspect, the invention comprises the following principal parts: first, a machine tool having a work support adapted to be moved in opposite directions; second, a cutting tool adjacent said work support; third, means to move said support; fourth, auxiliary means to move said support, said auxiliary means serving also to lock the support in indexed position during the cutting operation; and fifth, a motor control system to operate said auxiliary moving means in accordance with the cycle of operations of the machine.

Referring more in detail to the figures of the drawing, a specific form of a metal working machine is shown, the particular one shown being a gear generating machine similar to that shown in Patent 1,290,270 granted to Maag, January 7th, 1919. For a complete description of this machine, reference may be had to this patent. The present specification will be, for the most part, limited to a description of the auxiliary moving means for the work support and the electric circuits by means of which this auxiliary moving means is controlled. For convenience the same reference numerals will be used in this specification to indicate corresponding parts found in the above mentioned patent.

A table 19 is rotatably mounted on a saddle 4 which, in turn, may be reciprocated along ways 3 on the base 1 of the machine. In order to move the saddle 4 and table 19 a shaft 21 is provided on which is slidably mounted a worm 20 in mesh with a worm wheel 19$^a$ formed as a part of the table 19. Also, a screw 11 is provided working in a nut formed in the saddle 4. By means of the screw 11 and the worm 20, the saddle 4 and table 19 may be reciprocated and rotated respectively. A gear 22 on the worm shaft 21 and a gear 13 on the screw 11 provide means whereby the screw and shaft respectively may be rotated in either direction so that the combined movement of the table 19 may be made to simulate the rolling movement of a gear upon its pitch cylinder.

During operation of the machine, the shaft 21 and screw 11 are rotated predetermined numbers of turns, the combined effect of which is to so position the table 19 that a gear mounted thereon may be in effect rolled through a distance equal to the circular pitch for a multiple thereof upon its particular pitch cylinder. This rolling action takes place in a number of short rolling movements in a step-by-step manner. By varying the number of turns through which the shaft 21 and screw 11 are rotated, the rolling action for gears having different numbers of teeth and different pitch cylinders may be simulated. Adjacent the table is an upright member shown fragmentarily at 300 which may be moved toward or from the table 19 and which has mounted thereon a vertically operated ram 97. This ram has mounted thereon a cutter in the form of a rack as shown at 104$^a$. During operation, this ram 97 with its cutter 104$^a$ is reciprocated in a vertical plane and the table 19 and saddle 4 are moved to reposition or index the gear to be cut when the cutter 104$^a$ is above and out of engagement with the gear. As soon as the indexing movement is complete the cutter 104$^a$ makes another cutting stroke. After a plurality of indexing movements of the gear, the saddle 4 is or may be returned to initial position.

It will be understood that the present invention does not relate particularly to the movements or actuating means of the ram 97 or the cutter 104$^a$ or in the construction of the table 19 or saddle 4. For a complete understanding of the construction and operation of these parts, reference should be had to the above mentioned Maag patent.

During operation of the machine the position of the table 19 and the saddle 4 must be accurately determined so that the gear mounted on the table 19 will be disposed in a precise location relative to the cutter 104$^a$. Also after a plurality of cutting strokes of the cutter 104$^a$ and corresponding generating movements of the table 19, the saddle 4 must be returned to its original position and movement of the table 19 and saddle 4 again started in correct generating movements to continue the cutting of additional teeth of the gear. During each of these generating or indexing movements dependence may be had upon the screw 11 and the shaft 22 but these parts cannot operate without some lost motion which unless compensated for or taken up in the same manner for each stroke would be detrimental to the precision of the work operated on by the machine. Furthermore, if these parts were forced to withstand the entire strain of moving the table 19 and saddle 4, they would rapidly wear which would also have the effect of destroying the precision. In order to overcome any inaccuracies caused by possible lost motion between the moving parts, a device has been provided which in effect takes the place of the frictionally driven screw 12 shown in the patent above referred to and, in addition to this, it serves to lock the work support in predetermined position after having been moved to indexed position by means of the screw 11 and shaft 21.

This device comprises a small motor 30 mounted on an extension of the base 1 and connected by a pinion 31 with a driving gear 32 at one end of a screw 33. The screw 33 is mounted in suitable bearings 34 so that it is supported in a position parallel with the ways 3 and in intermeshing contact with the worm wheel 19a. It will be apparent therefore that rotation of the motor 30 in one direction will force not only the table 19 to rotate as far as permitted by the worm 20 but will also force the saddle 4 in the same direction as far as permitted by the screw 11. Also, by operating the motor to give a light turning effect during the operative movements of these parts it will relieve the screw 11 and worm 20 of most of their strain and wear.

During the indexing movements of the table 19 and saddle 4, it is desirable to rotate the motor 30 with sufficient force to urge the table and saddle in a predetermined direction with a slight force, in the meantime, the screw 11 and shaft 22 will also rotate thus permitting the screw 33 to axially move the saddle and rotate the table. As soon as the table and saddle have reached their indexed position which position is, of course, predetermined by the particular gear being cut and regulated by the rotation of the screw 11 and shaft 21, it is desirable to lock the table in that position. For this purpose a stronger rotative force should be applied to the screw 33 by motor 30. Also, since the table and saddle are to be returned to their initial position after a number of indexing movements, it is desirable that rotation of the motor 30 should be reversed at that time so that the screw 33 will aid in moving the table 19 and saddle 4 in a reverse direction. Simultaneously, the screw 11 and shaft 21 will be rotated in the opposite direction and will therefore determine the limit of movement of both the table 19 and saddle 4. The reversing mechanisms for the screw 11 and shaft 21 form no part of the present invention and these may be entirely similar to the reversing mechanisms shown and described in the above mentioned patent.

Figure 2:
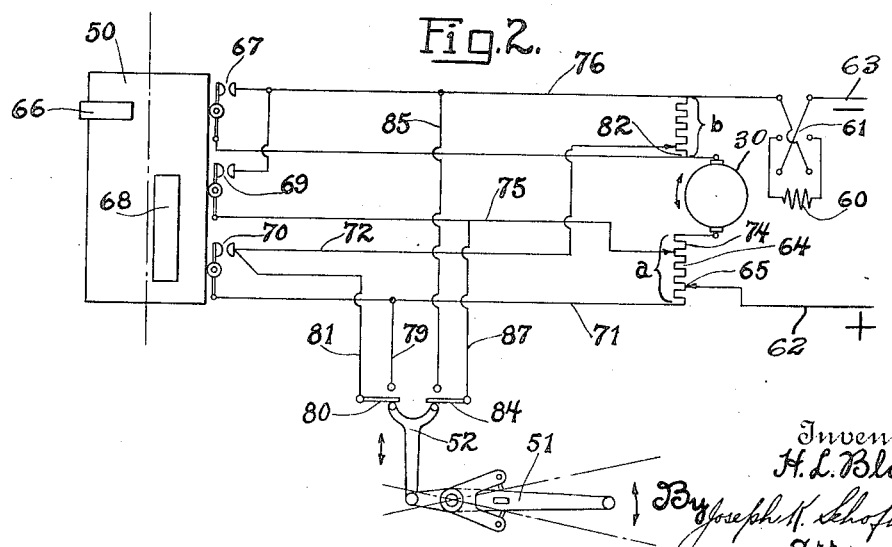
Fig. 2 is a diagrammatic view of the electrical circuits and switches by means of which the mechanisms may be controlled.

In order to accomplish the above results, the motor 30 is operated by circuits as shown diagrammatically in Fig. 2. A drum 50 is associated with the ram 97 preferably with the spindle operating the ram 97 as indicated in Fig. 1 so that this drum 50 makes one complete revolution with one complete movement of the ram 97 and cutter 104a. Also, on another part of the machine (not shown in Fig. 1) the lever 51 is oscillated to open and close a reversing switch 52 as soon as the table 19 and saddle 4 have reached their limit of movement and are about to start on their reverse movement. This switch 52 may be manually operated at the end of the table movement in its indexing direction or may be automatically operated by the reversing mechanism of the machine as defined in the above mentioned patent.

The circuits for operating the motor 30 to accomplish the functions indicated above will now be described. The field circuit 60 of the motor 30, which is preferably of the shunt type, is adapted to be excited in either direction to reverse its polarity. This is accomplished by means of the reversing switch 61 which is inserted directly in one of the main circuit wires 62 and 63. During the indexing movement of the machine, as above indicated, the motor 30 is rotated in one direction with a rather small torque. The direction may be reversed by manually throwing the switch 61 and thus reversing the polarity of the field circuit 60. During different periods of the cycle of operation different armature circuits are employed which preferably include resistance elements. When the machine is indexing, the section 64 of resistance $a$ is used, the amount being variable by adjustment of the contact point 65. Also during this indexing operation of the machine, the entire amount of resistance $b$ on the other side of the armature is used to reduce the armature current and thus limit the torque of the motor 30. This period of the cycle is shown in Fig. 2. As soon as the ram 97 is about to move on its downward or cutting stroke, the drum 50 is rotated so that the projecting cam 66 is moved to occupy a position to close the switch 67. This completely short-circuits the resistance $b$ and thus increases the armature current and consequently the torque applied to the motor 30. By reason of this resistance $b$ being short-circuited, the screw 33 is strongly urged forward and, acting against the screw 11 and the work 20 which have stopped rotation as soon as the index movement is complete, securely locks the table 19 and saddle 4 in predetermined indexed position. As soon as the cutting stroke of the ram has been completed, another indexing movement of the table and saddle takes place. It is desirable, however, before this starts to loosen the screw 33 to facilitate the action of the screw 11 and shaft 21 to again index the gear. This is accomplished by the cam 68 on the drum 50 which, when the switches 69 and 70 are closed, momentarily reverses the armature current through the motor 30. This cam strip 68 closes the switches 69 and 70 as soon as the cutting stroke is complete. This has the effect of momentarily reversing the direction of the armature current and consequently reversing the rotation of the motor 30. During this period of the cycle the armature circuit includes the lead 62, a part of resistance *a* to lead 71, the lead 72, a portion of resistance *b* to the armature. From this point, it leaves the armature through resistance 74 and lead 75, through switch 69 to the negative lead 76. This reverse action of the motor takes place for an instant only and while the cam strip holds switches 69 and 70 closed, after which the switches again open and the motor again starts in a direction to assist the index movements of the shaft 21 and screw 11.

As soon as the alternate indexing and cutting operations have extended as far as desired it is necessary to reverse the movement of the saddle 4 to return it to its initial position so that additional rolling of the gear being cut may take place in front of the cutter 104ª. At this time, the double switch 52 is closed by operation of the reversing lever 51. This, of course, may be operated by hand, or, as indicated in the patent above referred to, by automatic reversing means provided on the main control drum of the machine. At the same time, the movement of the ram 97 is discontinued by appropriate means described in the above mentioned patent, preferably these may be the drum cam 150 and the member 185 shown in Fig. 10. With the double switch 52 closed, the armature current passes in the same direction through the armature as when the cam 68 operates to close the switches 69 and 70, and therefore the motor 30 rotates in a direction reverse to that during the indexing operation.

During the reverse movement of the saddle 4, the worm 20 slides along the shaft 21 to which it is splined without rotating so that no rolling of the gear takes place. The function of the rotation of screw 33 at this time is merely to assist in the movement of saddle 4 and relieve the screw 11 of the major portion of the stresses involved. The armature circuit during reverse movement of the saddle 4 includes leads 71 and 79, switch 80, leads 81 and 72, and a small part 82 of resistance *b* to the armature. From the armature the circuit includes part 74 of resistance *a*, the leads 75 and 87, switch 84, and lead 85 to the negative lead 76.

It is frequently desirable to rotate the table 19 and move the saddle 4 in the opposite direction than that assumed in the circuit shown in Fig. 2 during indexing so that the gear will be indexed and thus generated while rolling in the opposite direction. In order to facilitate this without effecting the other circuits of the machine, the throw over switch 61 may be operated to reverse the polarity of the field so that the motor 30 will be operated in the reverse direction as compared to when running as in the above mentioned indexing direction.

As indicated in Fig. 2, leads 65 and 75 are adapted to be attached to different parts of the resistance *a*, and the lead 72 to resistance *b*. By suitably adjusting the positions of the leads 65, 75 and 72 on these resistances the turning effect of the motor 30 may be very widely varied at all periods of the cycle of operations.

What I claim is:

1. A metal cutting machine comprising in combination, a cutting tool, a work support, means to move said work support in opposite directions to position work carried thereby relative to said cutting tool, auxiliary means to assist in moving said support, said auxiliary means being reversible to assist in moving said support in both directions, and means to operate said auxiliary moving means to lock said support in predetermined positions during the cutting operation.

2. A metal cutting machine comprising in combination, a cutting tool, a work support, means to move said work support in opposite directions to position work carried thereby relative to said cutting tool, and electrically operated auxiliary means to assist in moving said support, said auxiliary means being reversible to assist in moving said support in both directions.

3. A metal cutting machine comprising in combination, a cutting tool, a work support, means to move said work support in opposite directions to position work carried thereby relative to said cutting tool, electrically operated auxiliary means to assist in moving said support, said auxiliary means being reversible to assist in moving said support in both directions, and means to operate said auxiliary moving means to lock said support in predetermined positions during the cutting operation.

4. A metal cutting machine comprising in combination, a cutting tool, a work support, means to move said work support in opposite directions to position work carried thereby relative to said cutting tool, auxiliary means to assist in moving said support, a motor to operate said auxiliary means in either direction, and means to operate said auxiliary moving means to lock said support in predetermined positions during the cutting operation.

5. A metal cutting machine comprising in combination, a cutting tool, a work support, means to move said work support in opposite directions to position work carried thereby relative to a cutting tool, auxiliary means to assist in moving said support, a motor to operate said auxiliary means in either direction, and means to increase the torque on said motor to lock said support in predetermined positions during the cutting operation.

6. A metal cutting machine comprising in combination, a cutting tool, a work support, means to move said support in opposite directions, auxiliary means to assist in moving said support, said means comprising an electric motor and a screw driven thereby engaging said support, means to reverse the rotation of said motor to assist in moving said support in either direction, and means to increase the torque of said motor when operating in either direction to lock said support in any predetermined position.

7. A metal cutting machine comprising in combination, a cutting tool, a work support, means to move said support in opposite directions, independently actuated auxiliary means to assist in moving said support, said means comprising an electric motor and a screw driven thereby engaging said support, means to reverse the rotation of said motor to assist in moving said support in either direction, and means to increase the torque of said motor when operating in either direction to lock said support in any predetermined position.

8. A metal cutting machine comprising in combination, a cutting tool, a work support, means to move said support in opposite directions, auxiliary means to assist in moving said support, said means comprising an electric motor and a screw driven thereby engaging said support, means to reverse the rotation of said motor to assist in moving said support in either direction, means to increase the torque of said motor when operating in either direction to lock said support in any predetermined position, and means to momentarily reverse the rotation of said motor to unlock said work support.

9. A metal cutting machine comprising in combination, a cutting tool, a work support, means to move said support in opposite directions, auxiliary means to assist in moving said support, said means comprising an electric motor and a screw driven thereby engaging said support, means to reverse the rotation of said motor in timed relation to the movement of said support to assist in moving said support in either direction, and means to increase the torque of said motor when operating in either direction to lock said support in any predetermined position.

10. A metal cutting machine comprising in combination, a cutting tool, a work support, means to move said support in opposite directions, auxiliary means to assist in moving said support, said means comprising an elecric motor and a screw driven thereby engaging said support, means to reverse the rotation of said motor in timed relation to the movement of said support to assist in moving said support in either direction, means to increase the torque of said motor when operating in either direction to lock said support in any predetermined position, and means to momentarily reverse said motor to unlock said support.

In testimony whereof, I hereto affix my signature.

HAROLD L. BLOOD.